US010333358B2

(12) United States Patent
Bae et al.

(10) Patent No.: US 10,333,358 B2
(45) Date of Patent: *Jun. 25, 2019

(54) RECEIVING ANTENNA AND WIRELESS POWER RECEIVING DEVICE INCLUDING THE SAME (71) Applicant: LG INNOTEK CO., LTD., Seoul (KR)

(72) Inventors: Seok Bae, Seoul (KR); Yu Seon Kim, Seoul (KR); Sang Hak Lee, Seoul (KR); Don Chul Choi, Seoul (KR); Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,106

(22) Filed: May 9, 2018

(65) Prior Publication Data
US 2018/0262064 A1 Sep. 13, 2018

Related U.S. Application Data (63) Continuation of application No. 14/900,467, filed as application No. PCT/KR2014/005255 on Jun. 16, 2014, now Pat. No. 9,997,950.

(30) Foreign Application Priority Data

Jun. 20, 2013 (KR) .......................... 10-2013-0070928

(51) Int. Cl.
H01Q 7/00 (2006.01)
H02J 7/02 (2016.01)
(Continued)

(52) U.S. Cl.
CPC .............. H02J 50/70 (2016.02); H01F 38/14 (2013.01); H01Q 7/00 (2013.01); H02J 7/025 (2013.01);
(Continued)

(58) Field of Classification Search
CPC ... H02J 7/025; H02J 50/10; H02J 7/04; H01F 38/14; H01Q 7/00; H04B 5/0037; H04B 5/0081
(Continued)

(56) References Cited

U.S. PATENT DOCUMENTS 9,362,776 B2 * 6/2016 Low ........................ G04C 10/00
2010/0007215 A1 1/2010 Sakuma
(Continued)

FOREIGN PATENT DOCUMENTS

CN 101523693 A 9/2009
CN 101630562 A 1/2010
(Continued)

OTHER PUBLICATIONS

Supplementary European Search Report dated Dec. 5, 2016 in European Application No. 14814416.5.
(Continued)

Primary Examiner — Drew A Dunn
Assistant Examiner — Sailesh Thapa
(74) Attorney, Agent, or Firm — Saliwanchik, Lloyd & Eisenschenk (57) ABSTRACT A receiving antenna of a wireless power receiving device wirelessly charging electric power according to an embodiment of the present invention includes a substrate, a first soft magnetic layer stacked on the substrate, and including a soft magnetic material, and a receiving coil configured to receive electromagnetic energy emitted from a wireless power transmission device, and including a first coil layer wound in parallel with the soft magnetic layer, and a second coil layer electrically connected to the first coil layer and wound in parallel with the first coil layer, and a current direction of the first coil layer is opposite to a current direction of the second coil layer.

14 Claims, 6 Drawing Sheets (51) Int. Cl.
  *H04B 5/00* (2006.01)
  *H01F 38/14* (2006.01)
  *H02J 50/10* (2016.01)
  *H02J 50/70* (2016.01)

(52) U.S. Cl.
  CPC ............ *H02J 50/10* (2016.02); *H04B 5/0037* (2013.01); *H04B 5/0081* (2013.01)

(58) Field of Classification Search
  USPC .......................................................... 320/108
  See application file for complete search history.

(56) References Cited

U.S. PATENT DOCUMENTS

| | | | |
|---|---|---|---|
| 2010/0181842 A1 | 7/2010 | Suzuki et al. | |
| 2012/0074899 A1 | 3/2012 | Tsai et al. | |
| 2012/0086281 A1 | 4/2012 | Kanno | |
| 2013/0169399 A1* | 7/2013 | Yoo | H01F 17/0013 336/180 |
| 2014/0306656 A1* | 10/2014 | Tabata | H01F 38/14 320/108 |

FOREIGN PATENT DOCUMENTS

| | | |
|---|---|---|
| CN | 101681719 A | 3/2010 |
| CN | 102709686 A | 10/2012 |
| EP | 2290782 A2 | 3/2011 |
| JP | 2002-271127 A | 9/2002 |
| JP | 2004-348497 A | 12/2004 |
| KR | 10-2008-0012782 A | 2/2008 |
| KR | 10-2010-0111409 A | 10/2010 |
| KR | 10-2011-0124695 A | 11/2011 |
| KR | 10-2012-0057636 A | 6/2012 |
| KR | 10-2013-0050633 A | 5/2013 |
| WO | WO-2008/016273 A1 | 2/2008 |

OTHER PUBLICATIONS

Office Action dated Mar. 7, 2018 in Chinese Application No. 201480046518.7, along with its English translation.
Office Action dated Jun. 29, 2017 in U.S. Appl. No. 14/900,467.
Office Action dated Jun. 27, 2018 in Korean Application No. 10-2018-0046239.
Office Action dated Oct. 15, 2018 in Chinese Application No. 201480046518.7, along with its English translation.

* cited by examiner

RECEIVING ANTENNA AND WIRELESS POWER RECEIVING DEVICE INCLUDING THE SAME

CROSS-REFERENCE TO RELATED APPLICATIONS

This application is a continuation of U.S. application Ser. No. 14/900,467, filed Dec. 21, 2015, which is a U.S. national stage application of International Patent Application No. PCT/KR2014/005255, filed Jun. 16, 2014, which claims priority to Korean Application No. 10-2013-0070928, filed Jun. 20, 2013, the disclosures of each of which are incorporated herein by reference in their entirety.

TECHNICAL FIELD

The present invention relates to wireless charging, and more particularly, to a receiving antenna for wireless charging and a wireless power receiving device including the same.

BACKGROUND ART

The wireless power transceiving technology is a technology which provides electric power to electronic devices wirelessly, and may be diversely applied to a power supply for household electronic products and for electric cars or subway trains, as well as battery charging of portable terminals.

It is necessary to minimize an energy loss between a wireless power transmission device and a wireless power receiving device to increase power transceiving efficiency. For this, a transmitting antenna and a receiving antenna may be mutually arranged within an effective distance. Further, a soft magnetic material may be disposed around the transmitting antenna and the receiving antenna to focus electromagnetic energy emitted from the transmitting antenna toward the receiving antenna.

However, the soft magnetic material disposed around the receiving antenna is thin, and has a high magnetic permeability in the direction of a plane. When the magnetization value of the soft magnetic material for the receiving antenna is saturated, the electromagnetic energy emitted from the transmitting antenna may be leaked out. Accordingly, a method of increasing transmission efficiency between the transmitting antenna and the receiving antenna is required.

DISCLOSURE

Technical Problem

The present invention aims to provide a structure of a receiving antenna capable of improving wireless power receiving efficiency of a wireless power receiving device.

Technical Solution

According to an embodiment of the present invention, a receiving antenna of a wireless power receiving device wirelessly charging electric power includes a substrate, a first soft magnetic layer stacked on the substrate, and including a soft magnetic material, and a receiving coil including a first coil layer wound in parallel with the soft magnetic layer, and a second coil layer electrically connected to the first coil layer and wound in parallel with the first coil layer, and a current direction of the first coil layer is opposite to a current direction of the second coil layer.

The receiving antenna may further include a support film formed between the first coil layer and the second coil layer, and the first coil layer may be connected to the second coil layer through a through hole formed in the support film.

At least a part of each of the first coil layer and the second coil layer may be embedded in the first soft magnetic layer.

The receiving antenna may further include a second soft magnetic layer formed between the substrate and the first soft magnetic layer.

At least a part of each of the first soft magnetic layer, the first coil layer and the second coil layer may be embedded in a case of the wireless power receiving device.

The receiving antenna may further include an adhesive layer of a polyethylene terephthalate (PET) material between the first and second coil layers and the soft magnetic layers.

The first coil layer and the second coil layer may be a coil layer having a same shape, and the second coil layer may be reversed and then stacked on the first coil layer.

According to another embodiment of the present invention, a wireless power receiving device wirelessly charging electric power includes a substrate, a first soft magnetic layer stacked on the substrate and including a soft magnetic material, a receiving coil configured to receive electromagnetic energy emitted from a wireless power transmission device, and including a first coil layer wound in parallel with the soft magnetic layer and a second coil layer electrically connected to the first coil layer and wound in parallel with the first coil layer, wherein a current direction of the first coil layer is opposite to a current direction of the second coil layer, a circuit unit connected to the receiving coil, and configured to convert the electromagnetic energy into electrical energy, and a storage unit configured to store the electrical energy.

Advantageous Effects

According to embodiments of the present invention, the performance of electromagnetic energy focusing of a receiving antenna in a wireless power receiving device can be increased, and therefore wireless power transceiving efficiency can be maximized. Particularly, improved power transmission efficiency can be obtained by decreasing thickness of the receiving antenna and decreasing a distance between a transmitting antenna and the receiving antenna.

Accordingly, an electromagnetic energy focusing effect of a required standard even with a thin thickness can be obtained, and therefore the present invention can be applied to various electronic devices of the slimness trend such as a TV, a portable terminal, a notebook, a tablet PC, etc.

Further, the wireless power receiving device according to the embodiments of the present invention has an excellent electromagnetic energy focusing performance and can use inexpensive materials, and therefore, can be applied to a large application field such as electric cars, subway trains, etc.

Further, even when a wireless power transmission device includes a permanent magnet, improved power transmission efficiency can be obtained by absorbing effect of the permanent magnet. Further, it is interchangeable for a wireless power transmission device which does not include the permanent magnet.

Further, a fabrication process is simple and additional increase in costs is small.

MODE FOR INVENTION

While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

It will be understood that, although the terms "first," "second," etc. may be used herein to describe various components, these components should not be limited by these terms. These terms are only used to distinguish one component from another component. Thus, a first component discussed below could be termed a second component and the second component discussed below could be termed the first component without departing from the teachings of the present inventive concept. The "and/or" includes each and all combinations of one or more of the items mentioned.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the inventive concept is not intended to limit the scope of the inventive concept. Elements of the inventive concept referred to in the singular may number one or more, unless the context clearly indicates otherwise. It will be further understood that the terms "comprise", "have", etc. when used herein, specify the presence of stated features, numbers, steps, operations, elements, components, and/or groups thereof, but do not preclude the presence or addition of one or more other features, numbers, steps, operations, elements, components, and/or groups thereof.

Unless otherwise defined, all terms (including technical and scientific terms) used herein are to be interpreted as is customary in the art to which this inventive concept belongs. It will be further understood that terms in common usage should also be interpreted as is customary in the relevant art and not in an idealized or overly formal sense unless expressly so defined herein.

Hereinafter, example embodiments are described with reference to the attached drawings, and same or corresponding elements regardless of drawing symbols will be given the same reference numbers, and overlapping descriptions will be omitted.

Figure 1:
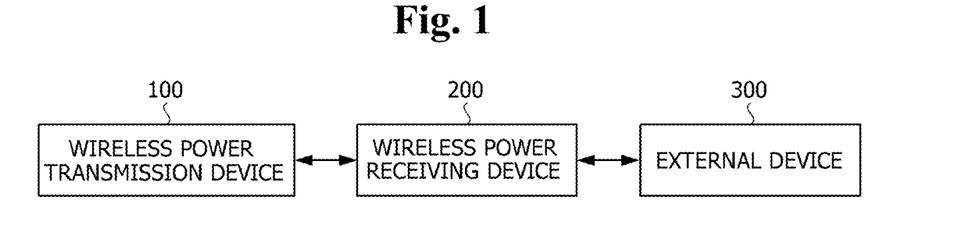
FIG. 1 is a block diagram illustrating a wireless power transceiver system in accordance with an embodiment of the present invention.

FIG. 1 is a block diagram illustrating a wireless power transceiver system in accordance with an embodiment of the present invention.

Referring to FIG. 1, the wireless power transceiver system may include a wireless power transmission device 100 and a wireless power receiving device 200. The wireless power transmission device 100 connected to a power supply applies electrical energy to a transmitting antenna, and the transmitting antenna converts the electrical energy into electromagnetic energy and emits the electromagnetic energy to the surroundings. The wireless power receiving device 200 receives the electromagnetic energy emitted from the transmitting antenna using a receiving antenna, converts the electromagnetic energy into the electrical energy, and performs charging.

Here, the wireless power transmission device 100 may be, for example, a transmission pad. Further, the wireless power receiving device 200 may be a part of a structure of a portable terminal, household/personal electronic products, a transportation means, etc. The portable terminal, household/personal electronic products, a transportation means, etc. may be set to include only the wireless power receiving device 200, or to include both the wireless power transmission device 100 and the wireless power receiving device 200.

Here, the wireless power transmission device 100 may transmit electric power using an electromagnetic induction method or a resonance method. Similarly, the wireless power receiving device 200 may receive the electric power using the electromagnetic induction method or the resonance method.

Meanwhile, the wireless power receiving device 200 may include a module which simultaneously has a wireless power conversion (WPC) function and a near field communication (NFC) function. Here, the wireless power receiving device 200 may perform NFC with an external device 300 including an NFC module.

Figure 2:
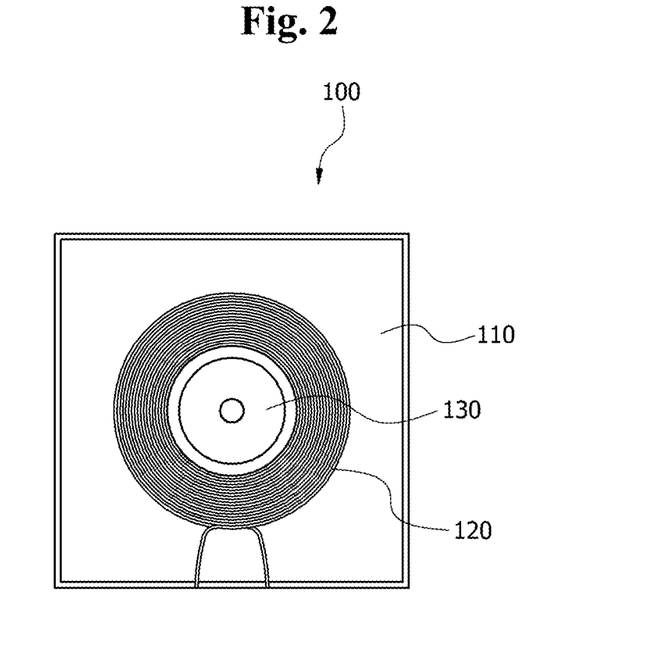
FIG. 2 is a diagram illustrating a part of a wireless power transmission device.
Figure 3:
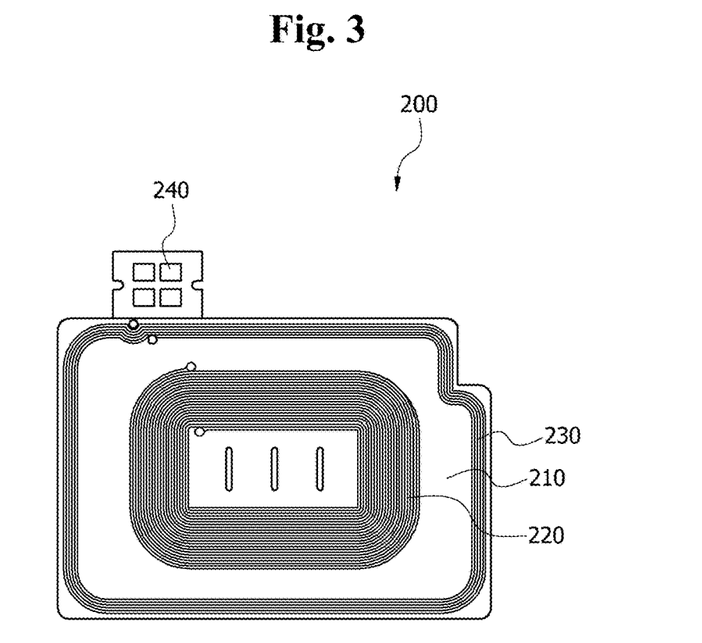
FIG. 3 is a diagram illustrating a part of a wireless power receiving device.

FIG. 2 is a diagram illustrating a part of a wireless power transmission device, and FIG. 3 is a diagram illustrating a part of a wireless power receiving device.

Referring to FIG. 2, the wireless power transmission device 100 may include a transmitting circuit (not shown), a soft magnetic core 110, a transmitting antenna 120, and a permanent magnet 130.

The soft magnetic core 110 may include a soft magnetic material having a thickness of several mms. Further, the transmitting antenna 120 consists of a transmitting coil, and the permanent magnet 130 may be surrounded by the transmitting antenna 120.

Referring to FIG. 3, the wireless power receiving device 200 may include a receiving circuit (not shown), a soft magnetic layer 210, and a receiving coil 220. The soft magnetic layer 210 may be stacked on a substrate (not shown). The substrate may include many layers of fixed sheets, and may be connected to the soft magnetic layer 210 to fix the soft magnetic layer 210.

The soft magnetic layer 210 focuses the electromagnetic energy emitted from the transmitting antenna 120 of the wireless power transmission device 100.

The soft magnetic layer 210 may include a metallic material or a ferrite material, and may be implemented in various forms of a pellet, a plate, a ribbon, foil, a film, etc. In an example embodiment, the soft magnetic layer 210 may be a single metal or alloy powder flake including at least one of Fe, Co, and Ni or a composite form including a polymer resin. In another example embodiment, the soft magnetic layer 210 may be an alloy ribbon, a stacked ribbon, foil, or a film including at least one of Fe, Co, and Ni. In still another example embodiment, the soft magnetic layer 210 may be a composite including 90 wt % or more of FeSiCr flakes and 10 wt % or less of a polymer resin. In yet another example embodiment, the soft magnetic layer 210 may be a sheet, a ribbon, foil, or a film including nickel-zinc (Ni—Zn) ferrite.

The receiving coil 220 may be stacked on the soft magnetic layer 210. The receiving coil 220 may be wound in a direction parallel to the soft magnetic layer 210 on the soft magnetic layer 210. For example, a receiving antenna applied to a smart phone may have a form of a spiral coil which has an outer diameter of no more than 50 mm and an inner diameter of 20 mm or greater. The receiving circuit converts the electromagnetic energy received through the receiving coil 220 into the electrical energy, and charges a battery (not shown) with the converted electrical energy.

Although not shown, a heat dissipation layer may be further included between the soft magnetic layer 210 and the receiving coil 220. In this specification, the substrate, the soft magnetic layer 210 and the receiving coil 220 together may be referred to as the receiving antenna.

When the wireless power receiving device 200 simultaneously has the WPC function and the NFC function, an NFC coil 230 may be further stacked on the soft magnetic layer 210. The NFC coil 230 may be formed to surround an outer portion of the receiving coil 220.

Further, the receiving coil 220 and the NFC coil 230 may be electrically connected to each other through a terminal 240.

Figure 4:
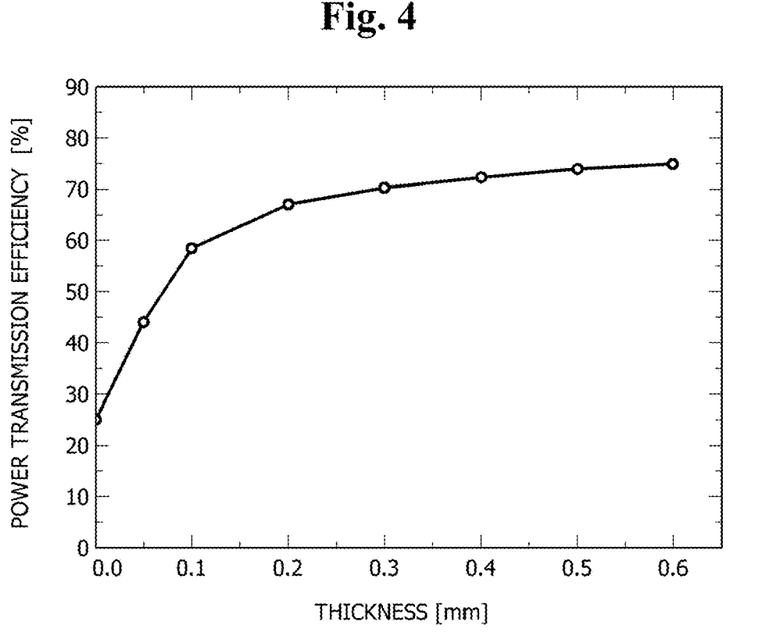
FIG. 4 is a graph illustrating power transmission efficiency between a wireless power transmission device and a wireless power receiving device based on a thickness of a soft magnetic layer.

FIG. 4 is a graph illustrating power transmission efficiency between a wireless power transmission device and a wireless power receiving device based on a thickness of a soft magnetic layer.

Referring to FIG. 4, when a soft magnetic layer having a permeability of 50 is used, the power transmission efficiency shows a trend that abruptly increases until a thickness of the soft magnetic layer reaches 0.1 mm, and then slowly increases after a thickness of 0.2 mm. That is, when the thickness of the soft magnetic layer becomes 0.2 mm to 0.3 mm, most of magnetic field shielding is possible. Meanwhile, a lost energy reaching 25% is assumed to be leaked aside through a gap (about 5 mm) between a transmitting antenna and a receiving antenna.

When the wireless power transmission device include a permanent magnet, a distance between the transmitting antenna and the receiving antenna is 5 mm, and a thickness of the soft magnetic layer stacked on a receiving coil is 0.2 mm, in a range of 50 to 200 of a magnetic permeability, a magnetic inductive coupling coefficient may have a value of 0.75 to 0.8. That is, considering a conductive loss and a circuit loss, it is general to obtain a transmission efficiency of 60 to 70%.

Meanwhile, Equation 1 denotes the magnetic inductive coupling coefficient.

$$k = \frac{M}{\sqrt{L_{Rx}L_{Tx}}} \quad \text{Equation 1}$$

Here, k denotes the magnetic inductive coupling coefficient, $L_{Rx}$ denotes inductance of the receiving antenna, $L_{Tx}$ denotes inductance of the transmitting antenna, and M denotes a mutual inductance between the transmitting antenna and the receiving antenna.

$L_{Rx}$ may be denoted as Equation 2, and $L_{Tx}$ may be denoted as Equation 3.

$$L_{Rx} = L_{Rx\text{-}self} + L_{Rx\text{-}Mutual} \quad \text{Equation 2}$$

$$L_{Tx} = L_{Tx\text{-}self} + L_{Tx\text{-}Mutual} \quad \text{Equation 3}$$

Here, $L_{Rx\text{-}self}$ denotes a self-inductance of the receiving antenna, $L_{Rx\text{-}mutual}$ denotes a mutual inductance of the receiving antenna, $L_{Tx\text{-}self}$ denotes a self-inductance of the transmitting antenna, and $L_{Tx\text{-}mutual}$ denotes a mutual inductance of the transmitting antenna.

Referring to Equations 1 to 3, inductances of the transmitting antenna and the receiving antenna should be decreased to increase k. $L_{Rx\text{-}self}$ and $L_{Tx\text{-}self}$ are electrical properties determined based on a length of a conductor, and therefore the inductance may be decreased according to a turn number of an antenna. However, this also may have an effect on the mutual inductance between the transmitting antenna and the receiving antenna, and therefore may not be effective. Further, k may be increased by decreasing $L_{Tx\text{-}mutual}$, but this may cause weakness of a magnetic field of the transmitting antenna. Accordingly, a method of increasing k by decreasing $L_{Rx\text{-}mutual}$ may be considered.

According to an embodiment of the present invention, the mutual inductance of the receiving antenna, i.e., $L_{Rx\text{-}mutual}$ is decreased using a coupled coil structure, and k, i.e., the magnetic inductive coupling coefficient is increased, and therefore the power transmission efficiency can be increased.

Figure 5:
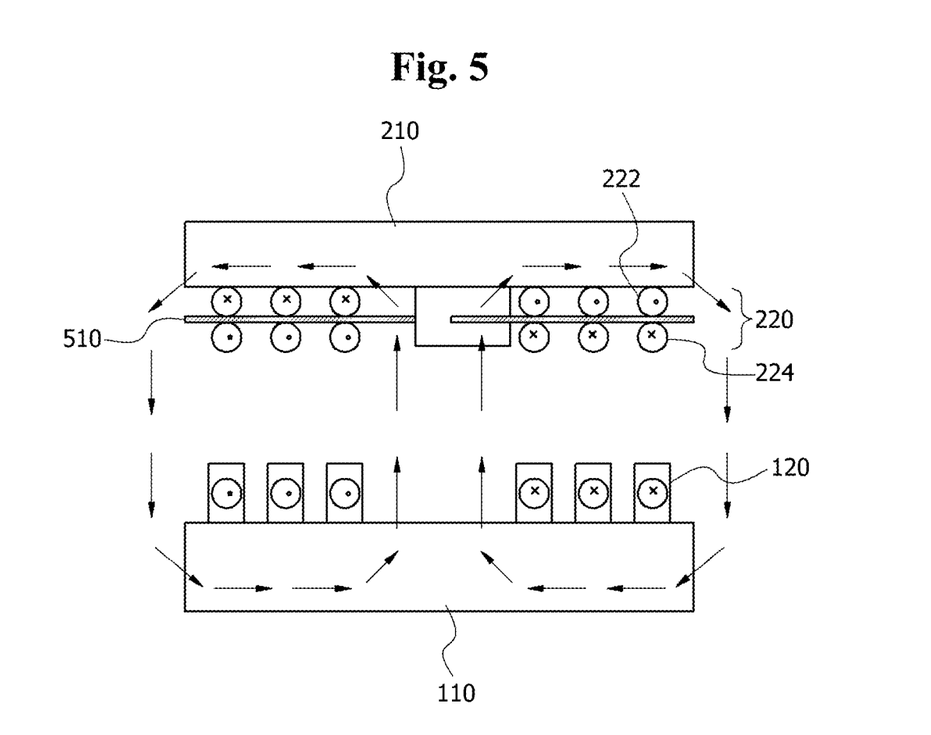
FIG. 5 is a cross-sectional view illustrating a part of a wireless power transmission device and a wireless power receiving device in accordance with an embodiment of the present invention.

FIG. 5 is a cross-sectional view illustrating a part of a wireless power transmission device and a wireless power receiving device in accordance with an embodiment of the present invention.

Referring to FIG. 5, the receiving coil 220 is formed on one surface of the soft magnetic layer 210. Although it is illustrated that the receiving coil 220 is formed under the soft magnetic layer 210 to indicate relationship between the wireless power transmission device and the wireless power receiving device, the structure of the receiving antenna including the soft magnetic layer 210 and the receiving coil 220 may be reversed to 180°. Although not shown, an adhesive sheet may be further included between the soft magnetic layer 210 and the receiving coil 220 to bond the soft magnetic layer 210 and the receiving coil 220. Although not shown, an insulating layer may be formed between the soft magnetic layer 210 and the receiving coil 220. Accordingly, insulation can be performed between the soft magnetic layer 210 and the receiving coil 220.

Here, the receiving coil 220 may include at least two coil layers, and one coil layer may be stacked on the other coil layer. That is, the receiving coil 220 may include a first coil layer 222 wound in parallel with a plane of the soft magnetic layer 210, and a second coil layer 224 wound in parallel with a plane of the first coil layer 222. Further, a support film 510 may be stacked between the first coil layer 222 and the second coil layer 224 to support both of the coil layers. The support film 510 may include a polyimide (PI) material.

Here, the first coil layer 222 and the second coil layer 224 may be electrically connected to each other. That is, a terminal of the first coil layer 222 may be connected to a terminal of the second coil layer 224. For example, a terminal of the first coil layer 222 may be connected to a terminal of the second coil layer 224 through a through hole formed in the support film 510.

Here, a current direction of the first coil layer 222 is opposite to a current direction of the second coil layer 224. Therefore, inductance may be cancelled, and the mutual inductance of the receiving antenna, i.e., $L_{Rx-mutual}$ may be decreased, and k, i.e., the magnetic inductive coupling coefficient may be increased.

Figure 6A:
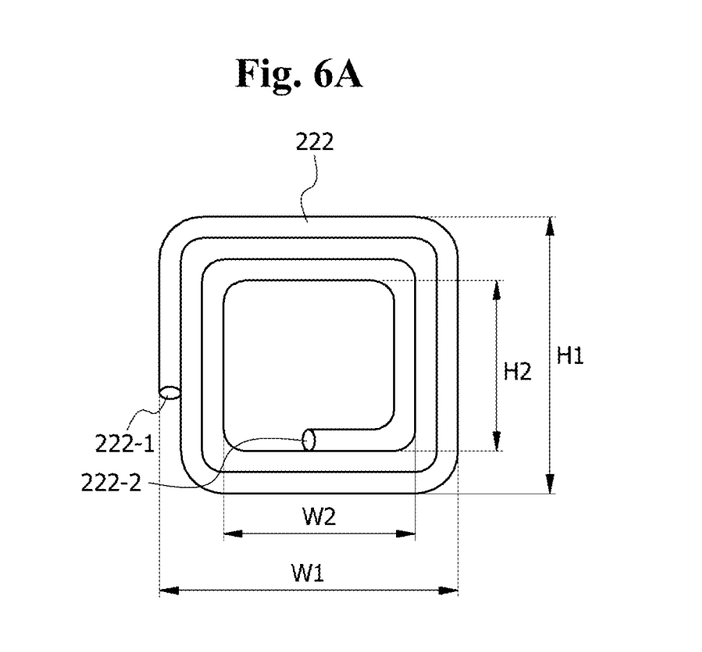
FIG. 6A and FIG. 6B is a diagram illustrating an embodiment of a first coil layer and a second coil layer.
Figure 6B:
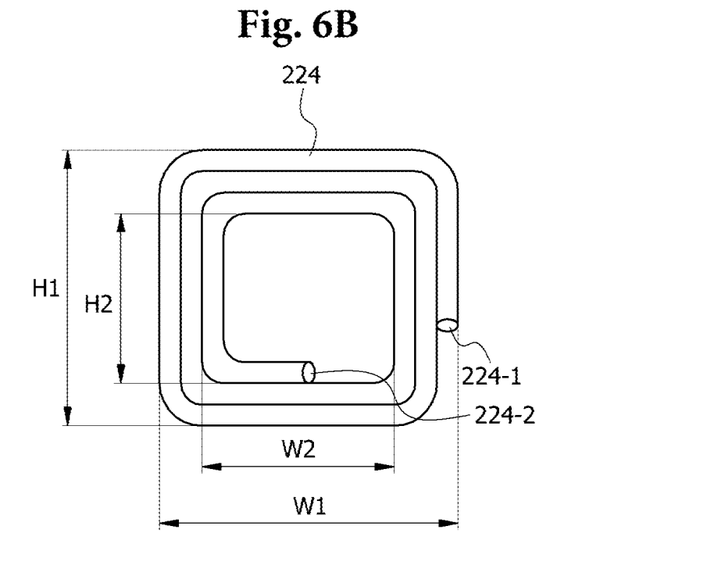

According to an embodiment of the present invention, the first coil layer 222 and the second coil layer 224 may have the same shape, and may be reversed to 180° from each other and then stacked. FIG. 6A and FIG. 6B is a diagram illustrating an embodiment of a first coil layer and a second coil layer. Referring to FIG. 6A and FIG. 6B, widths W1 and W2, heights H1 and H2, and turn numbers of the first coil layer 222 and the second coil layer 224 are same, and the same coil layers may be reversed and overlapped. That is, on the first coil layer 222, the second coil layer 224 having the same shape as the first coil layer 222 may be formed to be reversed and completely cover the first coil layer 222. Further, one of two terminals 222-1 and 222-2 of the first coil layer 222 may be electrically connected to one of two terminals 224-1 and 224-2 of the second coil layer 224.

Although not shown, the NFC coil 230 may be formed to surround the receiving coil 220. Here, the NFC coil 230 may include two coil layers electrically connected to each other like the receiving coil 220.

Meanwhile, according to embodiments of the present invention, at least one of the first coil layer 222 and the second coil layer 224 may be embedded in the soft magnetic layer 210.

Figure 7:
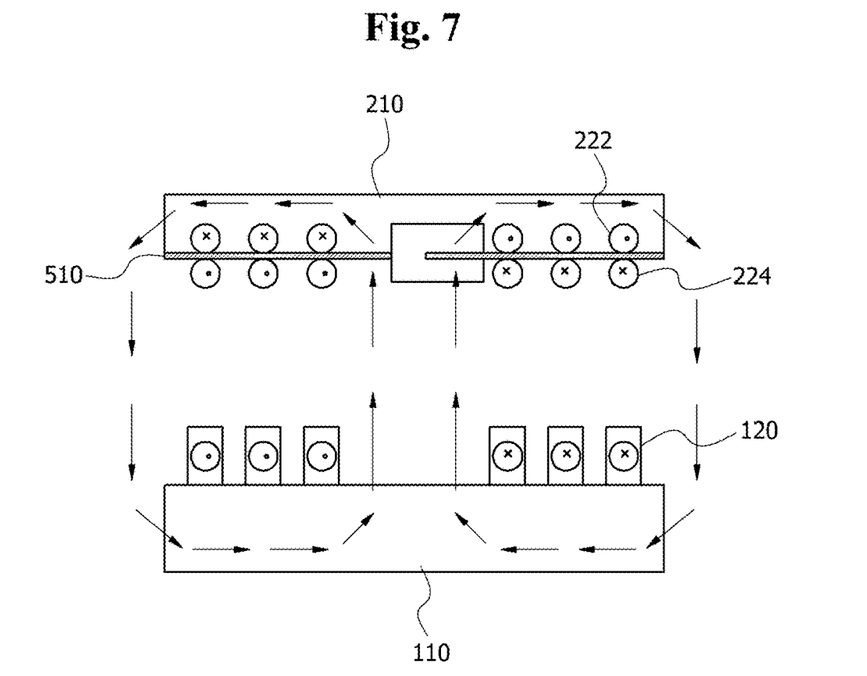
FIG. 7 is a cross-sectional view illustrating an embodiment in which one coil layer is embedded in a soft magnetic layer in accordance with an embodiment of the present invention.
Figure 8:
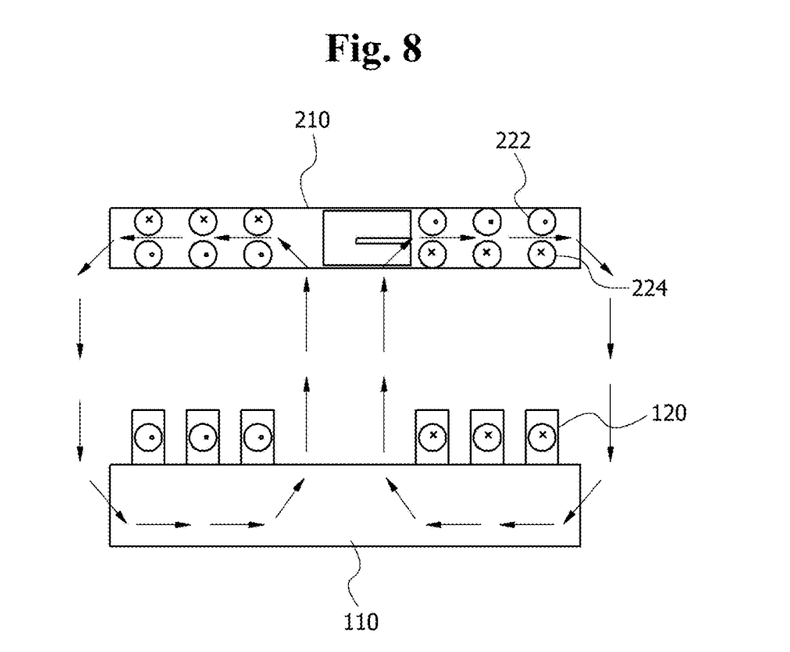
FIG. 8 is a cross-sectional view illustrating an embodiment in which two coil layers are embedded in a soft magnetic layer in accordance with another embodiment of the present invention.

FIG. 7 is a cross-sectional view illustrating an embodiment in which one coil layer is embedded in a soft magnetic layer in accordance with an embodiment of the present invention, and FIG. 8 is a cross-sectional view illustrating an embodiment in which two coil layers are embedded in a soft magnetic layer in accordance with another embodiment of the present invention.

Referring to FIGS. 7 and 8, in the coupled coil structure of the receiving antenna, one coil layer 222 or two coil layers 222 and 224 may be embedded in the soft magnetic layer 210. The soft magnetic layer 210 may include a composite including a soft magnetic metal and a polymer resin in order to facilitate embedment of the coil layers 222 and 224. The coil layers 222 and 224 may be embedded in the condition of 150° C. and 100 kgf/cm² using a hot-press process.

Although not shown, an adhesive sheet of a polyethylene terephthalate (PET) material may be further included between the coil layers 222 and 224 and the soft magnetic layer 210. The adhesive sheet of the PET material may insulate a space between the coil layers 222 and 224 and the soft magnetic layer 210.

As described above, when at least a part of the coil layers 222 and 224 is embedded in the soft magnetic layer 210, a distance between a receiving coil and a transmitting coil may be decreased, and the entire thickness of the receiving antenna may be decreased. Therefore, a leakage magnetic flux generated outwards due to a gap between the receiving coil and the transmitting coil may be reduced, and the mutual inductance between the receiving coil and the transmitting coil may be increased, and consequently the magnetic inductive coupling coefficient is increased and the power transmission efficiency can be increased.

Meanwhile, according to embodiments of the present invention, a sheet of a soft magnetic material may be laminated on the other surface of the soft magnetic layer 210 to minimize the leakage magnetic flux.

Figure 9:
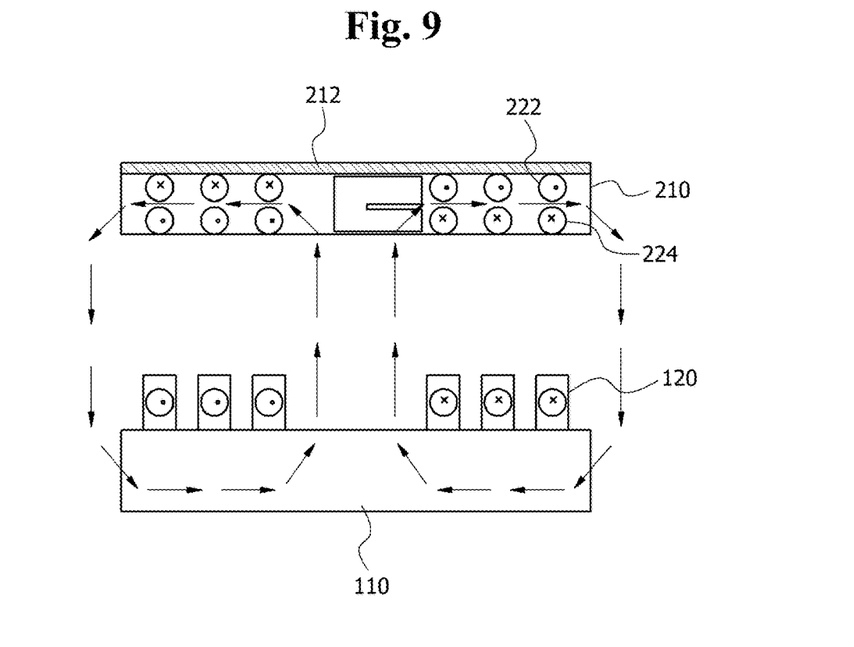
FIG. 9 is a cross-sectional view illustrating an embodiment in which a sheet of a soft magnetic material is laminated in accordance with an embodiment of the present invention.

FIG. 9 is a cross-sectional view illustrating an embodiment in which a sheet of a soft magnetic material is laminated in accordance with an embodiment of the present invention.

Referring to FIG. 9, in a structure in which the coil layers 222 and 224 are embedded in the soft magnetic layer 210, a sheet 212 of a soft magnetic material may be laminated on the other surface of the soft magnetic layer 210. In this specification, the soft magnetic layer 210 may be interchangeable with a first soft magnetic layer, and the sheet 212 of a soft magnetic material may be interchangeable with a second soft magnetic layer.

Accordingly, magnetic flux leaked outwards can be blocked due to the coil layers 222 and 224.

In FIG. 9, although only the example in which two coil layers are embedded in the soft magnetic layer 210 is shown, the sheet 212 of a soft magnetic material may be further laminated in the structure in which only one coil layer is embedded in the soft magnetic layer 210 or both of the coil layers are not embedded in but stacked on the soft magnetic layer 210.

Further, according to embodiments of the present invention, the receiving antenna including a soft magnetic layer and a receiving coil may be embedded in a case of the wireless power receiving device.

Figure 10:
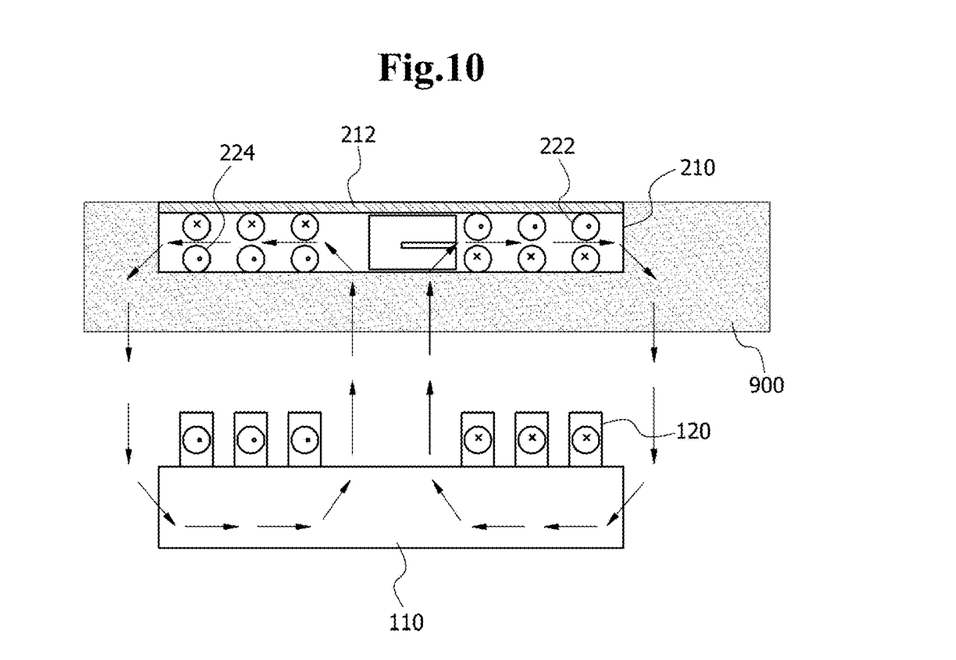
FIG. 10 is a cross-sectional view illustrating an embodiment in which a receiving antenna is embedded in a case of a back surface of a portable terminal in accordance with an embodiment of the present invention.

FIG. 10 is a cross-sectional view illustrating an embodiment in which a receiving antenna is embedded in a case of a back surface of a portable terminal in accordance with an embodiment of the present invention.

Referring to FIG. 10, in a structure in which two coil layers 222 and 224 are embedded in the soft magnetic layer 210 and the sheet 212 of a soft magnetic material is laminated, the coil layers 222 and 224, the soft magnetic layer 210, and the sheet 212 of a soft magnetic material are embedded in a case 900 of a back surface of a portable terminal. For this, a groove may be formed on the case 900 of the back surface of the portable terminal, and then the groove and a receiving antenna structure can be bonded together.

Accordingly, a distance between the receiving coil 220 and the transmitting coil 120 may be decreased, and the power transmission efficiency can be increased.

In FIG. 10, although only the example in which two coil layers 222 and 224 are embedded in the soft magnetic layer 210 and the sheet 212 of a soft magnetic material is laminated is shown, the coil layers 222 and 224, the soft magnetic layer 210, and the sheet 212 of a soft magnetic material may be embedded in a case in the structure in which only one coil layer is embedded in the soft magnetic layer 210 or both of the coil layers are not embedded in but stacked on the soft magnetic layer 210 or in the structure in which the sheet 212 of a soft magnetic material is not included.

Table 1 illustrates measured results of the power transmission efficiency according to various embodiments of the present invention.

TABLE 1

| No. | Structure | Transmission efficiency | Thickness of soft magnetic layer | Thickness of receiving coil | Others | Thickness of embedment | Total thickness |
|---|---|---|---|---|---|---|---|
| Comparative Example 1 | first layer receiving coil | 61% | 0.3 mm | 0.1 mm * 1 | support film (20 μm) adhesive sheet (30 μm) | — | 0.45 mm |
| Example 1 | second layer receiving coil | 65% | 0.3 mm | 0.1 mm * 2 | support film (20 μm) adhesive sheet (30 μm) | — | 0.55 mm |
| Example 2 | Example 1 + first layer embedding | 65.6% | 0.3 mm | 0.1 mm * 2 | support film (20 μm) adhesive sheet (30 μm) | 0.1 mm | 0.45 mm |
| Example 3 | Example 1 + second layer embedding | 66.9% | 0.3 mm | 0.1 mm * 2 | adhesive sheet (60 μm) | 0.2 mm | 0.36 mm |
| Example 4 | Example 3 + sheet adding | 68.2% | 0.35 mm | 0.1 mm * 2 | adhesive sheet (60 μm) | 0.2 mm | 0.41 mm |
| Example 5 | Example 4 + embedding in case | 68.2% | 0.35 mm | 0.1 mm * 2 | adhesive sheet (60 μm) | 0.41 mm | — |

Referring to Table 1, in Comparative Example 1, a general structure of a receiving antenna including a coil having a single layer whose thickness is 0.1 mm stacked on a soft magnetic layer which includes a composite of an FeSiCr-based soft magnetic metal and a polymer resin with a magnetic permeability of 50 and a thickness of 0.3 mm, and a polyimide film is used.

In Example 1, other conditions are same as Comparative Example 1, but a receiving antenna structure in which a two-layered coil having a thickness of 0.1 mm is stacked on a soft magnetic layer, and a support film is included between two coil layers is used.

In Example 2, other conditions are same as Comparative Example 1, but a receiving antenna structure in which one coil layer is embedded in a soft magnetic layer is used. Here, the coil is embedded on the condition of 150° C. and 100 kgf/cm$^2$ using a hot-press process.

In Example 3, other conditions are same as Comparative Example 1, but a receiving antenna structure in which both coil layers are embedded in a soft magnetic layer, and stamping on Cu foil having a thickness of 0.1 mm between the both coil layers is performed instead of using a support film. Here, the coil is embedded on the condition of 150° C. and 100 kgf/cm$^2$ using a hot-press process.

In Example 4, other conditions are same as the Example 3, but a receiving antenna structure in which a soft magnetic sheet having a thickness of 50 is further laminated is used.

In Example 5, other conditions are same as the Example 4, but a receiving antenna structure is embedded in a case including a PC-based resin on the condition of 80° C. and 10 kgf/cm$^2$ using a hot-block process.

Comparing Comparative Example 1 and Example 1, it can be noted that the power transmission efficiency is increased by 4%. Further, comparing Comparative Example 1, Example 2, and Example 3, it can be noted that while the total thickness remains same or is decreased, the power transmission efficiency can be increased by 4% or more.

Further, comparing Example 3 and Example 4, it can be noted that a leakage magnetic flux can be blocked and the power transmission efficiency can be maximized due to an additional lamination of a soft magnetic sheet.

Further, comparing Example 3 and Example 5, it can be noted that while the power transmission efficiency can be maximized, additional thickness for the receiving antenna is not required, and therefore a wireless power receiving device having a thin thickness can be implemented.

This written description sets forth the best modes of the invention. It will be understood by those skilled in the art that various modifications can be made without departing from the scope of the present invention and without changing essential features.

The invention claimed is:
1. A wireless power receiving device, comprising:
a magnetic layer;
a wireless power receiving coil including a first coil layer disposed on the magnetic layer, and a second coil layer disposed on the first coil layer of the wireless power receiving coil;
a near field communication coil including a first coil layer disposed on the magnetic layer, and a second coil layer disposed on the first coil layer of the near field communication coil; and
a support film disposed between the first coil layer of the wireless power receiving coil and the second coil layer of the wireless power receiving coil,
wherein the wireless power receiving coil is surrounded by the near field communication coil,
wherein the support film includes a first hole, wherein the first coil layer of the wireless power receiving coil is connected to the second coil layer of the wireless power receiving coil through the first hole of the support film, and wherein the first coil layer of the near field communication coil is connected to the second coil layer of the near field communication coil.

2. The wireless power receiving device according to claim 1, wherein the first coil layer of the wireless power receiving coil includes a first connection portion and a second connection portion, wherein the second coil layer of the wireless power receiving coil includes a first connection portion and a second connection portion, and wherein the first connection portion of the first coil layer of the wireless power receiving coil is connected to the first connection portion of the second coil layer of the wireless power receiving coil through the first hole of the support film.

3. The wireless power receiving device according to claim 2, wherein the second connection portion of the first coil layer of the wireless power receiving coil is connected to the second connection portion of the second coil layer of the wireless power receiving coil through a second hole of the support film.

4. The wireless power receiving device according to claim 1, further comprising a terminal connected to the wireless power receiving coil and the terminal also connected to the near field communication coil.

5. The wireless power receiving device according to claim 4, further comprising a circuit unit connected to the wireless power receiving coil through the terminal, and configured to convert electromagnetic energy into electrical energy.

6. The wireless power receiving device according to claim 5, further comprising a storage unit configured to store the electrical energy.

7. The wireless power receiving device according to claim 1, further comprising a circuit unit connected to the wireless power receiving coil, and configured to convert electromagnetic energy into electrical energy.

8. The wireless power receiving device according to claim 7, further comprising a storage unit configured to store the electrical energy.

9. The wireless power receiving device according to claim 1, wherein a pattern formed by the first coil layer of the wireless power receiving coil is the same as a pattern formed by the second coil layer of the wireless power receiving coil.

10. The wireless power receiving device according to claim 9, wherein the first coil layer of the wireless power receiving coil is disposed on a first surface of the support film, wherein the second coil layer of the wireless power receiving coil is disposed on a second surface of the support film opposite to the first surface, and wherein the first coil layer of the wireless power receiving coil is disposed such that its position on the first surface of the support film directly corresponds to a position of the second coil layer of the wireless power receiving coil on the second surface of the support film.

11. The wireless power receiving device according to claim 1, wherein the first coil layer of the wireless power receiving coil is disposed on a first surface of the support film, wherein the second coil layer of the wireless power receiving coil is disposed on a second surface of the support film opposite to the first surface, and wherein the first coil layer of the wireless power receiving coil is disposed such that its position on the first surface of the support film directly corresponds to a position of the second coil layer of the wireless power receiving coil on the second surface of the support film.

12. The wireless power receiving device according to claim 1, wherein a current direction of the first coil layer is opposite to a current direction of the second coil layer.

13. The wireless power receiving device according to claim 1, wherein the support film is disposed between the first coil layer of the near field communication coil and the second coil layer of the near field communication coil.

14. The wireless power receiving device according to claim 1, wherein the first coil layer of the wireless power receiving coil and the first coil layer of the near field communication coil are on a same plane.

* * * * *